United States Patent [19]

Zimmerman

[11] 4,147,485
[45] Apr. 3, 1979

[54] APPARATUS FOR AUTOMATIC CONTROL OF FOOD FORMING MACHINES

[75] Inventor: Clifton E. Zimmerman, Renton, Wash.

[73] Assignee: Automators, Inc., Renton, Wash.

[21] Appl. No.: 746,403

[22] Filed: Dec. 1, 1976

[51] Int. Cl.² ............................ A23P 1/00; A22C 7/00
[52] U.S. Cl. .......................................... 425/144; 17/32; 425/149; 425/238
[58] Field of Search ............... 425/149, 145, 143, 144, 425/135, 170, 238; 17/32

[56] References Cited

U.S. PATENT DOCUMENTS

| 3,179,069 | 4/1965 | Bartholomew | 425/238 X |
| 3,492,700 | 2/1970 | Kornmayer | 425/145 |
| 3,500,496 | 3/1970 | Perlberg et al. | 425/144 |
| 3,721,512 | 3/1973 | Ma et al. | 425/149 |

FOREIGN PATENT DOCUMENTS 51-2766  1/1976  Japan ........................................ 425/145

Primary Examiner—William R. Briggs
Attorney, Agent, or Firm—Christensen, O'Connor, Johnson & Kindness

[57] ABSTRACT

Method and apparatus for automatically controlling the density of molded food products that are produced by a forming machine which compresses ground meat or other shapable, plastic food substances. In the disclosed method and apparatus, the density of the molded product is maintained substantially constant to produce molded products of substantially uniform weight by sensing the temperature of the food substance being molded and automatically adjusting the forming pressure utilized to compress the food substance into the molded product as an inverse function of temperature. Arrangements suitable for use with a type of food forming machine wherein the forming pressure is controlled by rotation of a stroke adjustment rod and for use with a type of food forming machine wherein the forming pressure is controlled by pneumatic or hydraulic pressure as disclosed.

3 Claims, 4 Drawing Figures

APPARATUS FOR AUTOMATIC CONTROL OF FOOD FORMING MACHINES

BACKGROUND OF THE INVENTION

There are many situations in the food processing industry wherein food, which may be raw or cooked, is machine-formed into a molded food product. For example, meat, fish, poultry (or various combinations of such foods) that is ground, flaked, chopped (or otherwise processed to place it in a plastic state) is often compressed within a machine to form specific molded portions such as patties, balls or loaves. Generally the machines for forming these molded food products include a mold having one or more cavities of a shape corresponding to the desired shape of the molded product. The food being processed, e.g., ground meat, is delivered to the mold cavities from a hopper or bin and is compressed by a plunger or ram which presses the food into the mold cavities. Since the pressure exerted by the ram not only causes the food particles to adhere to one another, but also determines the density (weight per unit volume) of the molded product, it can be recognized that both the overall consistency of the molded product and the weight of the molded product are related to the volume of the mold cavities and the forming pressure. Specifically, in conventional food forming machines, the mold cavities are dimensioned such that the molded product will be of a desired size and shape with the pressure exerted by the ram being established to provide a molded product of the desired consistency.

Although establishing the volume of the mold cavity and the forming pressure basically determines the density of the molded product (and hence determines the weight of each molded product that is produced), it is generally true that a range of pressures will provide a molded product of satisfactory consistency. Thus, with respect to most conventional food forming machines, a manually operable adjustment mechanism is provided for adjusting the forming pressure so as to control the consistency of the formed product and also permit a certain degree of control over the density (or weight) of the molded product.

Rather precise control of the density and weight of the molded is relatively important to many food processors since oftentimes the molded food product is not sold on the basis of the individual weight of each molded product, but is sold on the basis of a minimum guaranteed weight. In such a situation, if a forming machine produces molded food products below the minimum weight limit, the product cannot normally be sold but often must be reprocessed at considerable expense to the food processor. On the other hand, if the forming machine produces molded food products of a weight that exceeds the minimum weight, the product may be acceptable to the customer, but the cost of the excess food utilized to form the molded food product must be borne by the food processor. When overweight products are produced, operating costs are increased regardless of whether the food processor bears this loss or reprocesses the product.

The manual pressure adjustment mechanism of conventional food forming machines has not provided a satisfactory solution of the problem of maintaining the weight of molded food products substantially constant. First, the density of the food being formed can change rather substantially over a period of time such as one work shift, such density changes being attributable to a number of sources such as changes in the composition of the food being processed, changes in moisture content, and changes in the temperature of the food being processed. To complicate matters, such changes in density can occur gradually or can occur rather abruptly. For example, during the operation of a machine for forming products such as meat patties, the temperature of the ground meat within the supply hopper may gradually increase since such ground meat is normally stored at a relatively low temperature, (e.g., frozen) and processed at ambient room temperature. Thus, a gradual temperature change and associated density change can occur during the period in which a particular portion of the ground meat remains in the hopper. When the hopper of such a machine is reloaded with meat, the density change can be abrupt, since the food being loaded into the hopper will normally be at a lower temperature than that meat remaining in the hopper and may also exhibit a different density because of having originated from a different batch or lot of meat.

Secondly, manual control of forming pressure to control the weight of the formed product is extremely difficult since the machine operator cannot be aware that the formed products are not within a desired weight range until a number of products having an unacceptable weight have been produced. That is, since conventional food forming machines generally operate at a rather high rate of speed with a relatively large number of formed products being provided per unit time and passing from the machine on a conveyor or other transport mechanism, it is generally not possible to weigh one or more molded food products and adjust the forming pressure without producing a substantial number of underweight or overweight products.

Because of these problems it has become accepted practice within many areas of the food forming industry to simply rely on the experience and skill of the machine operator to produce as few unacceptable products as possible, reprocessing those products that do not meet the minimum weight requirement and delivering those products which exceed the weight requirement to the customer without extra charge. Such a practice is not entirely satisfactory since even the most skilled operator can produce a substantial number of formed products wherein the weight of the product deviates from the desired weight by a substantial amount.

Accordingly, it is an object of this invention to provide a method and apparatus for automatically controlling the density of a machine formed food product to thereby cause such a machine to produce formed food products of substantially uniform density and weight.

It is another object of this invention to provide an automatic control system for continuously controlling the forming pressure of a food forming machine such that the machine produces formed food products of a substantially uniform weight.

It is yet another object of this invention to provide an automatic control method and apparatus wherein the weight of a formed food product is controlled to supply products within a specified weight tolerance so that such products will be acceptable to the customers of the food processor while simultaneously decreasing the processing costs associated with prior art manual control means.

SUMMARY OF THE INVENTION

These and other objects are achieved in accordance with this invention by sensing the temperature of the food being formed into a molded food product and automatically adjusting the forming pressure of the food forming machine as an inverse function of this temperature. In each embodiment of the invention, an electrical signal representative of the temperature of the food being processed is supplied to a control unit which operates an electric motor or other conventional actuator. The circuitry within the control unit causes the actuator to increase the forming pressure when the temperature of the food being processed decreases and causes the actuator to decrease the forming pressure when the temperature of the food being processed increases. To ensure that the change in forming pressure effects the desired change in density such that the food forming machine produces products of the desired weight, each embodiment of the invention includes a feedback arrangement that effectively compares the system stimulus, i.e., the temperature change, with the control action taken, i.e., the change in forming pressure.

In one embodiment of the invention, suitable for use with a food forming machine wherein the forming pressure is established by rotation of a rod that controls the stroke length of a ram or plunger a temperature sensor, which is in thermal communication with the food being processed controls the voltage division ratio of a resistive voltage divider network. The temperature representative signal supplied by the voltage divider network is coupled to one input terminal of a control unit which activates a motor that is arranged for rotating the stroke adjustment rod of the food forming machine. The voltage division ratio of a second resistive voltage divider is controlled by the angular position of the motor shaft, with the positional representative signal being supplied to a second input terminal of the control unit. The control unit is arranged to drive the motor to a position at which the signal representative of angular position of the motor shaft is substantially identical to the temperature representative signal. Thus, once the food forming machine has been initially adjusted to produce molded products of the desired density and weight, temperature changes in the food being formed cause rotation of the stroke adjustment rod to a position at which the weight of the formed products remains substantially constant.

In a second embodiment of the invention, suitable for use with a food forming machine that utilizes hydraulic or pneumatic pressure to control the forming pressure, an electrical signal representative of the temperature of the food being processed in supplied to one input terminal of a comparator circuit that activates an electric motor. The motor, in turn, drives a pressure control valve connected between the forming machine pneumatic or hydraulic pressure source and a piston which drives a plunger or ram that compresses the food into the desired food product. The second input terminal of the comparator circuit is supplied an electrical signal representative of the piston pressure by a pressure transducer arranged to sense the forming pressure being exerted by the piston.

In this embodiment of the invention, the control system is initialized by equalizing the temperature and pressure signals supplied by the temperature sensor and the pressure sensor when the machine is adjusted to produce molded products of the desired density, e.g., at the beginning of a work shift. Subsequent changes in the temperature of the food being processed cause the output signal supplied by the comparator circuit to change states so as to activate the switching circuit in a manner that causes the motor to open or close the pressure control valve. As the hydraulic or pneumatic pressure that drives the piston changes due to operation of the valve, the signal supplied by the pressure transducer undergoes a corresponding change. In this embodiment, the signal supplied by the pressure transducer is established such that the pressure signal will be substantially equal to the signal representative of the temperature of the food being formed when the forming pressure has reached the desired value. When the temperature and pressure signals have been so equalized, the output signal of the comparator again changes states to deactivate the motor.

BRIEF DESCRIPTION OF THE DRAWINGS

A better understanding of the present invention can be derived by reading the ensuing specification in conjunction with the accompanying drawings wherein.

DETAILED DESCRIPTION

Figure 1:
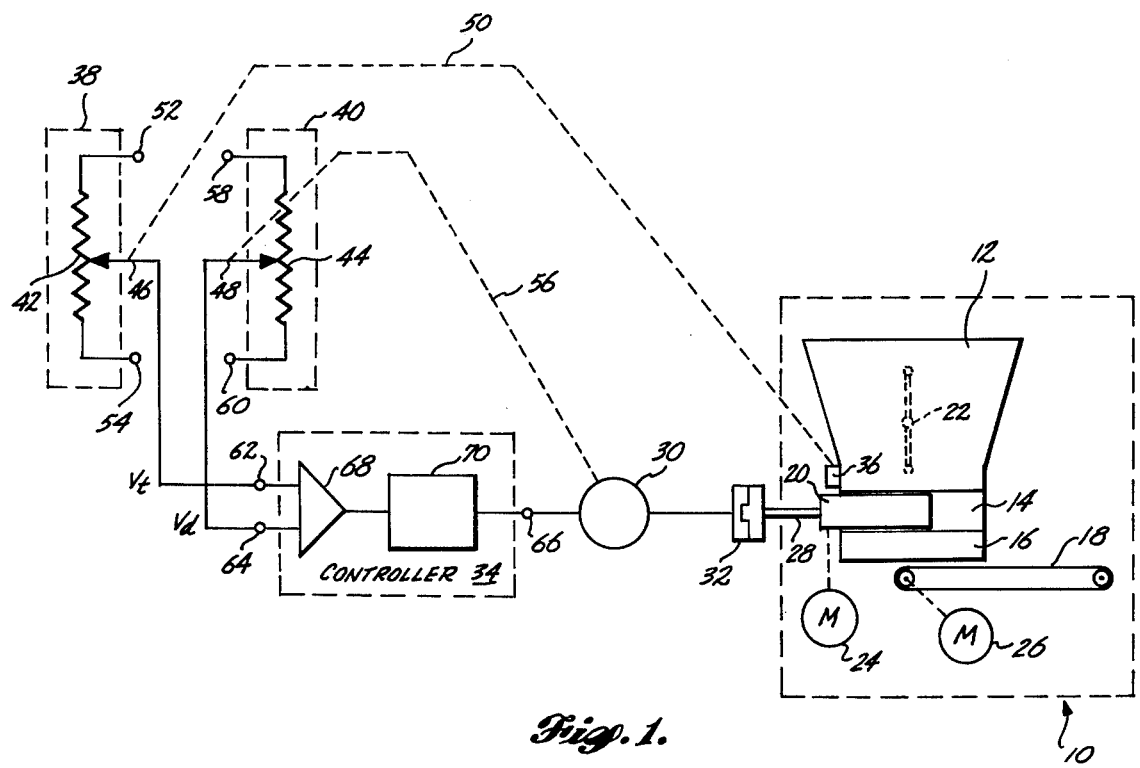
FIG. 1 is a block diagram of an embodiment of the control system of this invention for controlling a first type of food forming machine having a rotatable rod for adjusting forming pressure.

In the embodiment of the invention depicted in FIG. 1, a food forming machine 10 includes a hopper 12, a compression chamber 14, a molding station 16, a conveyor 18 and a ram 20. In operation, moldable food such as ground meat that is placed in the hopper 12 is delivered to the compression chamber 14 as a motor driven tumbler 22 rotates within the hopper 12. The ram 20, driven by a motor 24, compresses the modable food within the compression chamber 14 to load mold cavities (not shown in FIG. 1) that are located within the molding station 16. The molded food product compressed within the mold cavities of the mold station 16, is then ejected and carried from the food forming machine 10 by a conveyor 18 which is driven by a motor 26. In this type of machine, the stroke or travel of the ram 20 is adjusted by a rotatable stroke adjustment rod 28 to thereby control the forming pressure and hence control the density of the formed product.

Food forming machines such as food forming machine 10 of FIG. 1 are well known in the art, for example, a machine identified under the trademark POWER FORM, Model 840A, manufactured by Hollymatic Corporation, Park Forest, Illinois, is commonly utilized to shape fresh and/or frozen, raw ground meat into patties such as those used in hamburger sandwiches. Regardless of the type of food being formed, in the past the forming pressure of a food forming machine of the variety schematically depicted in FIG. 1 has been established by manually rotating the stroke adjustment rod 28. In this respect, the outwardly projecting end of the stroke adjustment rod 28 is generally shaped for engagement by a wrench or other hand tool.

Manual adjustment of the forming pressure of the food forming machine 10 is generally satisfactory in situations in which it is not necessary to rather precisely control the density or weight of each of the molded food products. When such precise control is necessary, however, it becomes extremely difficult for the machine operator to manually adjust the stroke adjustment rod 28 such that products of a uniform weight are produced. This difficulty is primarily caused by changes in density of the food being formed with such changes caused by changes in the composition of the food placed in the hopper 12, changes in moisture content, and temperature variations in the food being processed. In this respect, it has been discovered that, in a wide variety of applications, inversely controlling the forming pressure as a function of the temperature of the food being formed will produce molded food products of substantially uniform weight. More explicitly, it has been found that, although many factors contribute to the variations in density of the food being formed, there are many situations in which the prime cause of the density variation is a change in temperature experienced durng the processing period. This is especially true in applications such as the forming of food substances such as ground meat wherein the food supply is stored at relatively low temperature (e.g., frozen) and processed at ambient room temperature.

The embodiment of the invention depicted in FIG. 1 for automatically controlling the forming pressure of the food forming machine 10 includes a rotary actuator 30, mechanically coupled to the stroke adjustment rod 28 by means of a clutch 32; a controller 34 for activating the rotary actuator 30; a temperature sensor 36, which causes a transmitter unit 38 to supply a temperature representative input signal, $V_t$, to the controller 34; and, a transmitter unit 40, which supplies an electrical signal $V_d$ that is representative of the angular position of the output shaft of the rotary actuator 30 to the controller 34. As shall be described hereinafter, the rotary actuator 30, the controller 34, the transmitter unit 38 and the transmitter unit 40 effectively form a feedback system in which temperature changes in the food within the hopper 12 cause a differential signal $V_t$-$V_d$ to be developed which causes the rotary actuator 30 to rotate the stroke adjustment rod 28 until such rotation causes the signal $V_d$ to be substantially equal to the signal $V_t$.

In the arrangement of FIG. 1, the transmitter unit 38 and the transmitter unit 40 each include a variable resistor or potentiometer, 42 and 44, respectively. As is indicated by the dashed line 50, the position of the wiper arm 46 of the potentiometer 42 is controlled by the temperature sensor 36, which is in thermal communication with the food within the hopper 12 of the food forming machine 10. Thus, the transmitter 38 depicted in FIG. 1 is essentially a voltage divider network with the voltage division ratio being determined by the temperature of the food within the hopper 12. Accordingly, when an operating potential is applied between the terminals 52 and 54 of the potentiometer 42, the electrical signals $V_t$ at the potentiometer wiper terminal 46 is representative of the temperature of the food within the hopper 12. In a similar manner, the depicted transmitter unit 40 includes a potentiometer 44 wherein the position of the potentiometer wiper arm 48 is controlled by the position of the output shaft of the rotary actuator 30 (as indicated by the dashed line 56 of FIG. 1). Thus, when an operating potential is applied between the terminals 58 and 60 of the potentiometer 44, the electrical signal $V_d$ at the potentiometer wiper terminal 48 is representative of the angular position of the output shaft of the rotary actuator 30. Since the output shaft of the rotary actuator 30 is coupled to the stroke adjustment rod 28 by means of a clutch 32, the signal $V_d$ is representative of the angular displacement of the stroke adjustment rod 28.

The potentiometer wiper arms 46 and 48 are respectively coupled to input terminals 62 and 64 of the controller 34 with the output terminal 66 of the controller 34 being electrically connected to energize the rotary actuator 30. Specifically, the controller 34 is responsive to the difference between the signals $V_t$ and $V_d$ to rotate the output shaft of the rotary actuator 30 in one direction when $V_t$ is greater than $V_d$, and rotate the output shaft of the rotary actuator 30 in the opposite direction when $V_d$ is greater than $V_t$. Many conventional arrangements for implementing the controller 34 are known within the electrical arts. As indicated in FIG. 1, such arrangements often include a signal conditioning circuit 68, e.g., a differential amplifier, connected in cascade with a motor control circuit 70. In such a controller, the signal conditioning circuit 68 generally amplifies the differential input signal (i.e., $V_t$-$V_d$) and supplies the motor control circuit 70 with a first electrical signal when $V_t$ is greater than $V_d$ and supplies the motor control circuit 70 with a second electrical signal when $V_t$ is less than $V_d$. When the rotary actuator 30 is AC powered, the motor control circuit 70 often includes a switching circuit such as a conventional silicon controlled rectifier switching circuit. For example, in one realization of the embodiment of the invention depicted in FIG. 1, a rotary actuator manufactured by the Barber-Colman Company of Rockford, Illinois, and identified as a series EA electric actuator is used as the rotary actuator 30. This particular actuator includes a shaded pole driving motor, a gear train and a "slide wire" or potentiometer driven by the output shaft of the motor that is used as the transmitter 40 of FIG. 1. In this realization of the embodiment of FIG. 1, the controller 34 is a Model 657 resistance to position converter, also manufactured by the Barber-Colman Company, which includes the signal conditioning circuitry and a silicon controlled rectifier switching circuit for driving the rotary actuator in the above-described manner.

It should be recognized by those skilled in the art that many conventional electrical arrangements for providing an electrical signal that is representative of temperature are suitable for use as temperature sensor 36 and transmitter 38. For example, the previously referred to embodiment of the arrangement depicted in FIG. 1 utilizes a device manufactured by the Fenwal Corporation and identified as a Model 400 line indicating temperature controller. This particular temperature controller includes a liquid-filled bulb connected to a bellows arrangement by a capillary tube. As the temperature of the liquid within the bulb changes, the volume of the liquid changes to axially displace the bellows. Axial displacement of the bellows causes a corresponding axial displacement of an actuating pin which drives the wiper arm of a potentiometer such as the potentiometer 42 of FIG. 1. Other suitable arrangements include conventional thermistors arranged to form a voltage divider network equivalent to potentiometer 42 with the network including one or more thermistors that are in thermal communication with the food being processed, e.g., in thermal communication with the hopper 12.

It should also be recognized that the transmitter 38 and transmitter 40 can be interconnected in various manners. For example, interconnecting the terminal 52 of the transmitter 38 to the terminal 58 of the transmitter 40 and interconnecting the terminal 54 of the transmitter 38 to the terminal 60 of the transmitter 40 arranges the potentiometers 42 and 44 into a conventional resistive bridge circuit. In such an arrangement, changes in temperature cause an imbalance in the bridge with the bridge being rebalanced as the controller 34 drives the actuator 30 to a new setting. Such a bridge circuit can include the depicted potentiometers, or alternatively may include temperature sensitive devices such as the previously mentioned thermistors.

In any case, in the operation of the embodiment depicted in FIG. 1, the hopper 12 of the food forming machine 10 is first loaded with the food to be processed and the stroke adjustment rod 28 is adjusted to provide a forming pressure that produces a molded food product of the desired density. Adjustment of the stroke adjustment rod 28 is facilitated by disengaging the clutch 32 and manually rotating the stroke adjustment rod 28 in the conventional manner. When the temperature sensor 36 has stabilized at the temperature of the food being processed, the control system is adjusted to an equilibrium state. That is, the transmitter 38 and/or the transmitter 40 are adjusted such that the signal $V_t$ is substantially equal to the signal $V_d$. Such adjustment can be accomplished in a variety of manners. For example, variable resistors (not shown in FIG. 1) can be included in series with the potentiometer 42 and/or the potentiometer 44 of the arrangement of FIG. 1, or the operating potentials supplied to the transmitter 38 and/or the transmitter 40 can be adjusted to so balance the system. With the control system thus initialized, the clutch 32 is engaged. Thereafter, if the temperature of the food being processed changes, the signal $V_t$ supplied by the transmitter 38 increases or decreases to unbalance the system. Such an imbalance causes the controller 34 to supply an electrical signal to the actuator 30 causing the actuator 30 to rotate the stroke adjustment rod 28 and activate the transmitter 40 so as to cause the electrical signal $V_d$ to become equal to the electrical signal $V_t$. When the signals $V_t$ and $V_d$ are substantially equal, the controller 34 ceases to supply an electrical signal and the actuator 30 hence ceases to rotate the stroke adjustment rod 28 and alter the voltage $V_d$.

Figure 2:
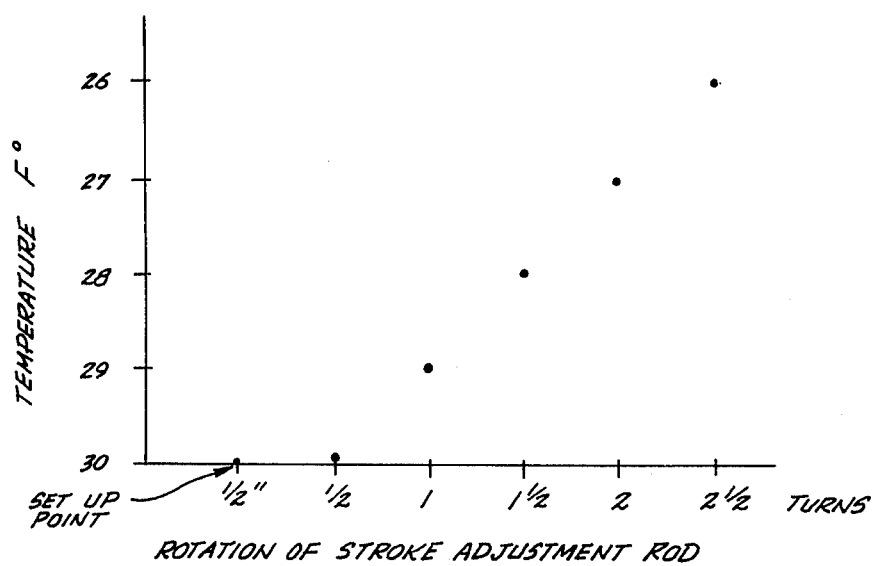
FIG. 2 graphically depicts the relationship between the temperature of the food being processed and the adjustment of the food forming machine rotatable rod which results in a formed food product of substantially uniform weight in one application of the embodiment depicted in FIG. 1.

It will be recognized by those skilled in the art that, for a given temperature change, the amount of rotation of the stroke adjustment rod 28 that is required to maintain the molded product at the desired density is dependent on the particular food forming machine being controlled. It will also be recognized that, upon determining the stroke adjustment versus temperature characteristics which maintain the molded food product at a constant density, the control system of this invention can be embodied to provide the proper control of the stroke adjustment rod 28. For example, FIG. 2 depicts the relationship between the temperature of the food being processed and rotation of the stroke adjustment rod which maintains hamburger patties being processed in the previously mentioned 840A food forming machine at a substantially constant weight. It can be noted in FIG. 2, that in this particular application of the invention, the stroke adjustment rod is rotated approximately one-half turn per degree Farenheit to maintain the formed product at the desired density and weight. If, in other applications of the invention, either more or less rotation is required, the embodiment of FIG. 1 can be easily adapted to supply the desired control. More explicitly, the amount of rotation per degree of temperature change can be increased simply by increasing the level of the signal $V_t$ supplied at each temperature, or decreasing the level of the signal $V_d$ supplied at each angular position of the shaft of the rotary actuator 30. For example, the operating potential applied between terminals 52 and 54 can be increased, the operating potential applied between the terminals 58 and 60 can be decreased, a suitable amplifier or other gain device can be placed in the signal path that couples the signal $V_t$ to the controller 34, or a suitable signal attenuation device can be placed in the signal path that couples the signal $V_d$ to the controller 34. In a corresponding manner, in an application wherein less angular rotation of the stroke adjustment rod 28 is required per degree of temperature change, the operating potential applied to the transmitters 40 and 42 can be suitably adjusted or suitable gain and attenuating devices can be utilized to control the relationship between $V_t$ and $V_d$ to thereby cause the required amount of rotation of the stroke adjustment rod.

Figure 3:
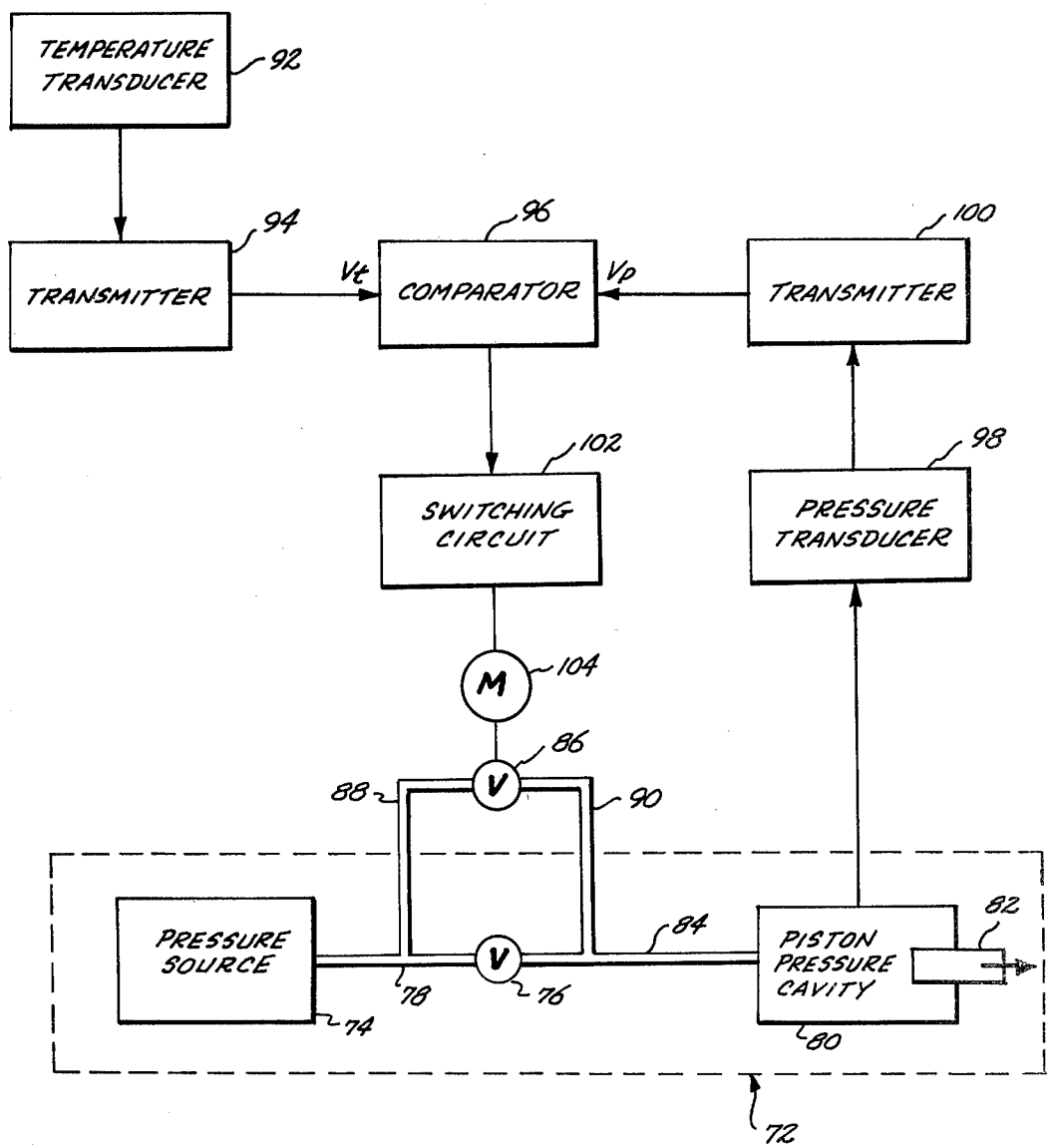
FIG. 3 is a block diagram of an embodiment of the control system of this invention for controlling a second type of food forming machine having hydraulic or pneumatic pressure means for controlling the forming pressure.

FIG. 3 depicts an embodiment of the control system of this invention for controlling the density of a formed food product produced by a food forming machine wherein the forming pressure that compresses the food is established by hydraulic or pneumatic means. One such machine, identified by the trademark FORMAX 26, is manufactured by FORMAX, Inc. of Mokena, Illinois. As shown in FIG. 3, such a food forming machine 72 includes a source of pneumatic or hydraulic pressure 74 that is linked to a manually adjustable valve 76 via a fluid conduit 78. The output of the valve 76 is connected to a pressure cavity 80, which drives a reciprocating piston 82, by means of a fluid conduit 84. It will be understood by those skilled in the art that, although not depicted in FIG. 3, the food forming machine 72 is similar to the food forming machine 10 of FIG. 1 and includes a hopper, a compression chamber, a molding station having a mold plate or other arrangement that includes cavities of a shape that corresponds to the shape of the food product being formed, and a plunger that compresses the food into the formed food product. The moldable food product that is placed in the hopper is delivered to the compression chamber by some means such as a feed screw system. The piston 82 is periodically activated by the pressure source 74 and drives the plunger to compress the food within the compression chamber, to load the mold cavities that are located within the compression chamber, with the valve 76 being adjusted to produce formed food products of a desired density. As in the case of the food forming machine 10 of FIG. 1, once the food has been compressed into the molded food product, the molded food is ejected from the molding station and passes from the food forming machine 72 on a transport device such as a conveyor.

To provide automatic control of the density of the food product being formed by the food forming machine 72, the embodiment of the invention depicted in FIG. 3 includes a pneumatic or hydraulic valve 86 which is automatically activated in accordance with temperature changes exhibited by the food being processed. In the depicted arrangement, the valve 86 is effectively connected in parallel with the valve 76 of the food forming machine 72 by means of a fluid conduit 88, which connects one side of the valve 86 to the fluid conduit 78 of the food forming machine 72, and by a fluid conduit 90, which interconnects the other side of the valve 86 with the fluid conduit 84 of the food forming machine 72.

A temperature transducer 92, which is in thermal communication with the food being processed within the food forming machine 72, is interconnected with a transmitter unit 94 to supply a signal $V_t$ to one input terminal of a comparator unit 96. As in the case of the embodiment of the invention depicted in FIG. 1, the temperature transducer 92 and the transmitter 94 can be any suitable conventional arrangement which supplies an electrical signal, i.e., a voltage or a current, that is proportional to the temperature being sensed by the temperature transducer.

To supply an electrical signal $V_p$ to the comparator 96 wherein the signal $V_p$ is representative of the forming pressure within the food forming machine 72, the arrangement of FIG. 3 includes a pressure transducer 98 and a transmitter unit 100. Both the pressure transducer 98 and the transmitter unit 100 can be conventional devices with the pressure transducer 98 being connected in fluid communication with the pressure cavity 80 or the fluid conduit 84. In any case, the temperature transducer 92, the pressure transducer 98 and the transmitters 94 and 100 are selected to function over the desired temperature and pressure range and are arranged to control the forming pressure, i.e., the pressure within the piston cavity 80 and the fluid conduit 84, as an inverse function of the temperature sensed by the temperature transducer 92 to thereby cause the food forming machine 72 to produce molded food products of a uniform weight. More explicitly, the transducers 92 and 98 and the transmitters 94 and 100 are selected and arranged such that the voltage $V_t$, supplied by the transducer 94, will be substantially equal to the voltage $V_p$, supplied by the transmitter 100, when the valve 86 is set to establish a forming pressure that maintains the molded food products at a constant density over the temperature range of interest.

The comparator unit 96 can be any conventional circuit arrangement which supplies a first output signal when the signal $V_t$ exceeds the applied signal $V_p$ by a predetermined amount, and supplies a second output signal when the applied signal $V_p$ exceeds the applied signal $V_t$ by a predetermined amount. Such conventional comparator circuits are well known in the art and often include one or more operational amplifiers. The output signal provided by the comparator unit 96 is connected to a switching circuit 102 which controls the operation of the valve 86 by means of an actuator or motor 104. The arrangement of the switching circuit 102 is primarily dictated by the type of motor or actuator 104 being employed in a particular embodiment. For example, if the actuator 104 is a DC motor wherein the direction of rotation is determined by the polarity of the excitation signal, the switching circuit 102 primarily comprises an amplifier circuit to amplify the signal provided by the comparator 96, with the comparator 96 being arranged to provide a signal of proper polarity, i.e., a signal of a first polarity when the signal $V_t$ exceeds the signal $V_p$ and a signal of a second polarity when the signal $V_p$ exceeds the signal $V_t$. In an embodiment in which the actuator 104 is an AC motor, the switching circuit 102 will generally include a circuit such as the previously mentioned silicon controlled rectifier switching circuit which supplies a signal suitable for driving the actuator 104 in one direction when $V_t$ exceeds $V_p$ and in the second direction when the signal $V_p$ exceeds the signal $V_t$.

In the arrangement of the invention depicted in FIG. 3, the food forming machine 72 is initially adjusted to provide a formed product of the desired density by adjusting the valves 76 and 86. Once the valves 76 and 86 have been initially adjusted, changes in the temperature of the food being processed cause the temperature transducer 92 and the transmitter 94 to supply a temperature representative signal $V_t$ to the comparator 96. When the difference between the signal $V_t$ and the signal $V_p$ exceeds the threshold of the comparator 96, the comparator actuates the switching circuit 102 which, in turn, activates the actuator 104 to appropriately adjust the valve 86. As the actuator 104 changes the setting of the valve 86, the fluid pressure within the fluid conduit 84 and piston cavity 80 undergoes a corresponding increase or decrease. In response to this change in pressure, the pressure transducer 98 and transmitter 100 cause the signal $V_p$ to increase or decrease. When the signal $V_p$ becomes equal to the signal $V_t$, the comparator 96 changes states to deactivate the switching circuit 102 and hence cause the actuator 104 to cease operation. With the actuator 104 thus deactivated, the forming pressure within the food forming machine 72 is established at a value which causes the food forming machine 72 to continue to produce molded food products of the desired density.

Figure 4:
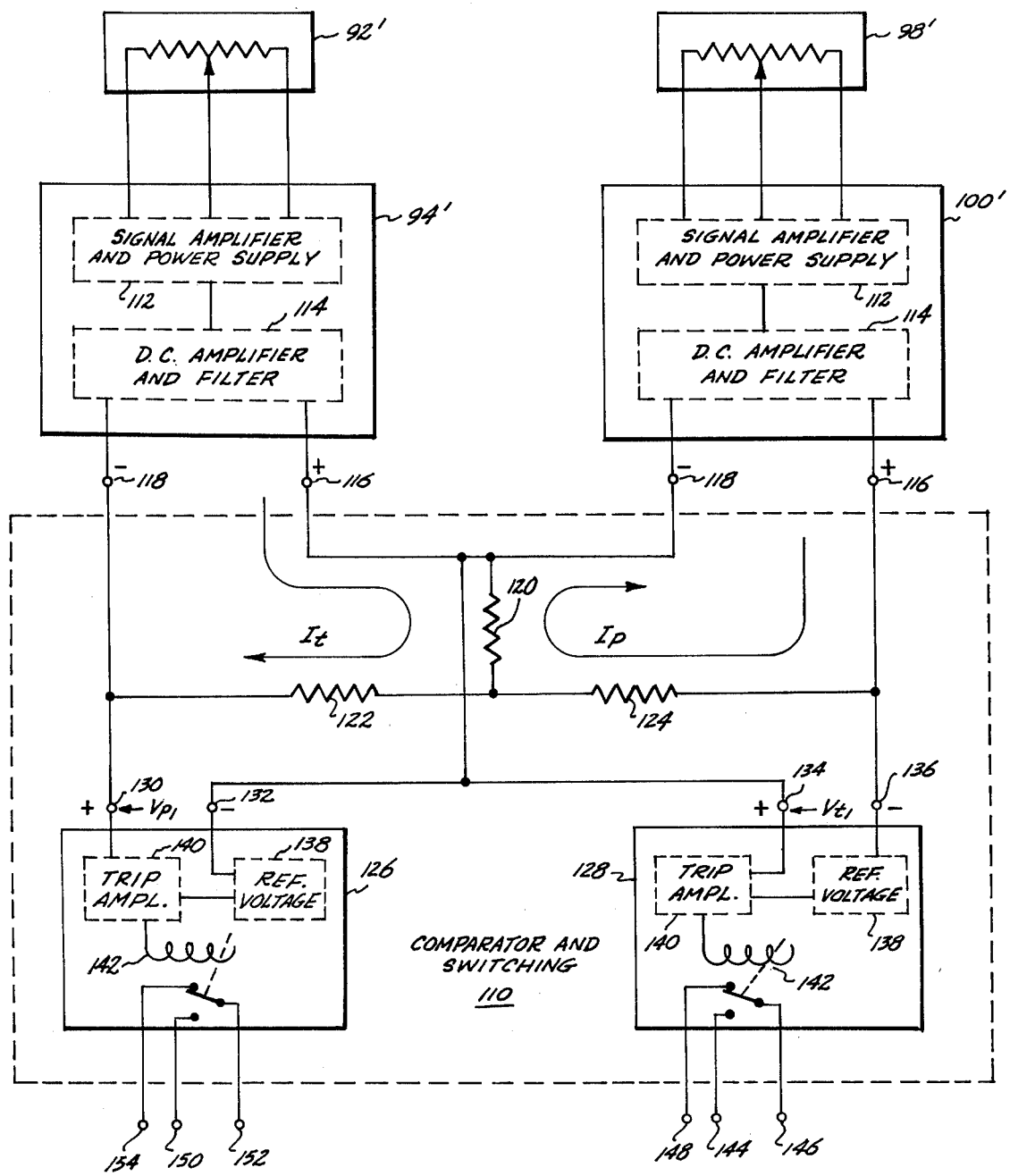
FIG. 4 depicts one arrangement of the transducers, transmitters, and comparator and switching circuits of the embodiment of FIG. 3.

FIG. 4 depicts one arrangement of the embodiment depicted in FIG. 3 which utilizes commercially available components and advantageously combines the comparator 96 and switching circuit 102 in a single comparator and switching circuit 110. In the arrangement of FIG. 4, the temperature transducer 92' is a potentiometer device wherein the position of the wiper arm is determined by the temperature of the food being processed. As discussed relative to the embodiment of FIG. 1, one such commercially available device is the model 400 line indicating temperature controller manufactured by the Fenwal Corporation. The terminals of the transducer 92' are connected to the input terminals of a transmitter unit 94' such as a series 800 transmitter manufactured by Acromag Incorporated of Wixon, Michigan.

To supply an electrical signal proportional to the pressure within the food forming machine cavity 80 of FIG. 3, the embodiment of FIG. 4 includes a pressure transducer such as the model P61 potentiometer pressure transducer manufactured by Robinson-Halpern of Plymouth Meeting, Pennsylvania. Such pressure transducers are effectively a potentiometer wherein the position of the wiper arm is a function of the fluid pressure coupled to the transducer. The terminals of the pressure transducer are connected to the input terminals of the transmitter 100', which can also be a series 800 transmitter manufactured by Acromag, Inc.

Each transducer 94' and 100' includes a signal amplifier and power supply 112 and a DC amplifier and filter 114. In operation, the signal amplifier and power supply 112 of the transmitters 94' and 100' respectively supply an operating potential to the transducers 92' and 98' and amplify the temperature representative and pressure representative signals supplied by the transducers. The DC amplifier and filter stages 114 of the transmitters 94' and 100' respectively supply an electrical current between the output terminals 116 and 118 that is proportional to the temperature of the food being processed and the fluid pressure within the food forming machine pressure cavity 80. In FIG. 4, these currents are respectively identified as $I_t$ and $I_p$. Controls, i.e., potentiometers within the transmitters 94' and 100', permit adjustment of the relationship between the output current and input signal to thereby permit the embodiment of FIG. 4 to be adjusted to impart the necessary control of the valve 86 relative to temperature changes of the food being processed.

To cause the signals $I_t$ and $I_p$ to operate the motor 104 of the embodiment of FIG. 3 such that the motor 104 actuates the valve 86 in the previously described manner, the comparator and switching unit 110 includes a resistive Tee network (resistors 120, 122 and 124) and further includes comparator operated relay circuits 126 and 128. Each comparator operated relay circuit 126 and 128 can be a conventional circuit such as the model 372-S-1 current alarm relay also manufactured by Acromag, Inc.

In the arrangement of FIG. 4, the positive output terminal 116 of the transmitter 94' and the negative output terminal 118 of the transmitter 100' are connected to one electrode of the resistor 120. The second electrode of the resistor 120 is commonly connected to one electrode of the resistors 122 and 124 with the second electrode of resistor 122 being commonly connected to the negative output terminal 118 of the transmitter 94' and the positive input terminal 130 of the comparator operated relay circuit 126 and the second electrode of the resistor 124 being commonly connected to the positive output terminal 116 of the transmitter 100' and the negative input terminal 136 of the comparator operated relay 128. The negative input terminal 132 of the comparator operated relay 126 and the positive input terminal 134 of the comparator operated relay 128 are each connected to that electrode of the resistor 120 that is connected to the output terminals of the transmitters 94' and 100'.

In view of the above described interconnection of the comparator and switching circuit 110, it can be seen that the voltages $V_{p1}$ and $V_{t1}$, respectively, applied the input terminals of the comparator operated relay circuit 126 and 128 are $$V_{p1} = I_p R_{120} - I_t (R_{120} + R_{122})$$
and,
$$V_{t1} = I_t R_{120} - I_p (R_{120} + R_{124})$$

where $V_{p1}$ is the voltage supplied between terminals 130 and 132 of the comparator operated relay 126; $V_{t1}$ is the voltage supplied between the terminals 134 and 136 of the comparator operated relay 128; $R_{120}$, $R_{122}$ and $R_{124}$ are the resistance values of the resistors 120, 122 and 124 respectively; and, $I_t$ and $I_p$ are the respective currents supplied by the transmitters 94' and 100'.

Further, since the comparator operated relay circuits 126 and 128 are each activated when the respective input signal $V_{p1}$ and $V_{t1}$ each reach a predetermined value, it can be seen that appropriately selecting the resistance values of the resistors 120, 122 and 124 will cause the comparator operated relay 126 to activate when the current $I_p$ exceeds the current $I_t$ by a predetermined amount and will cause the comparator operated relay 128 to activate when the current $I_t$ exceeds the current $I_p$ by a predetermined amount. For example, with respect to the previously mentioned model 372-S-1 current alarm relays, establishing the resistance of the resistor 120 at 400 ohms and the resistance of resistors 122 and 124 each at 40 ohms will cause the comparator operated relays to energize when the currents $I_p$ and $I_t$ deviate from one another by approximately 10%. Increasing the resistance value of the resistor 120 causes a corresponding increase in the circuit sensitivity, i.e., when the resistance value of the resistor 120 is 4000 ohms, the comparator operated relays will energize when the current deviation is 1%.

Each comparator operated relay 126 and 128 includes an adjustable reference voltage supply 138, a "trip amplifier" 140, and a relay 142. The trip amplifiers 140 are effectively comparator circuits that energize the relays 142 whenever the applied signal exceeds the signal level established by the reference voltage supply 138. In the embodiment of FIG. 4, the normally-open relay contacts 144 and 146 of the comparator operated relay 128 are connected to terminals of the motor 104 of FIG. 3 that cause the motor 104 to operate the valve 86 to decrease the fluid pressure in the pressure cavity 80. Similarly, the normally-open relay contacts 150 and 152 of the comparator operated relay 126 are connected to the motor 104 such that the motor is activated to increase the pressure within the cavity 80 whenever the comparator operated relay 126 is activated. Accordingly, it can be recognized that the embodiment of FIG. 4 is activated by changes in temperature of the food being processed to control the forming pressure as an inverse function of such temperature changes.

It will be recognized by those skilled in the art that the embodiments depicted herein are merely exemplary and that many variations therein can be practiced without departing from the scope and the spirit of this invention. For example, as previously mentioned, various arrangements can be utilized to realize the depicted temperature sensors and temperature transmitters. Further, with respect to the embodiment of FIG. 3, it can be realized that in some embodiments of the invention, the valve 86 may not be necessary and the output shaft of the motor 104 can be directly connected to the valve 76 of the food forming machine 72.

What is claimed is:

1. In a food forming machine for molding a food product from a moldable food substance wherein said food forming machine includes a compression chamber for receiving said moldable food substance, a molding station having mold cavities for receiving food substance from said compression chamber for forming a molded food product of predetermined size and shape, ram means operable to compress said moldable food substance within said compression chamber and establish a forming pressure that causes a portion of said food substance within said compression chamber to enter said mold cavities of said molding station and form said molded food product, and a rotatable rod operatively connected to said ram means for establishing the stroke length of said ram means to control said forming pressure established by said ram means, an improvement for automatically rotating said rotatable rod to cause said food forming machine to produce molded food products of a substantially constant weight and density, said improvement comprising:

temperature sensing means mounted in thermal communication with said food substance supplied to said compression chamber, said temperature sensing means for supplying a signal representative of the temperature of said food substance;

rotary actuator means having an output shaft operatively coupled to said rotatable rod, said rotary actuator means being responsive to a control signal for selectively activating said rotatable rod to increase and decrease said forming pressure;

signal supply means operatively interconnected with said rotary actuator means and responsive to a control action effected by said rotary actuator means, said signal supply means including a variable resistance device for supplying a signal representative of the position of said output shaft of said rotary actuator means; and controller means connected for receiving said signal supplied by said temperature sensing means and said signal supplied by said variable resistance device of said signal supply means, said controller means including means for supplying said control signal to said rotary actuator means to activate said rotary actuator for rotation of said rotatable rod in a first direction that decreases said forming pressure when said signal supplied by said temperature sensing means exceeds said signal supplied by said variable resistance device and to activate said rotary actuator for rotation of said rotatable rod in a second direction that increases said forming pressure when said signal supplied by said variable resistance device exceeds said signal supplied by said temperature sensing means.

2. A control system for operative interconnection with a food forming machine of the type which includes a compression chamber for receiving a moldable food substance, ram means operatively associated with said compression chamber for compressing said moldable food substance within said compression chamber, and a rotatable stroke adjustment rod for controlling the stroke length of said ram means to establish the pressure exerted by said ram means on said food substance within said compression chamber, said food forming machine further including a molding station having mold cavities for receiving food substance from said compression chamber, said mold cavities for forming a molded food product of predetermined size and shape as said ram means exerts said pressure on said food substance within said compression chamber, said control system for automatically operating said stroke adjustment rod to maintain molded food products formed by sequential operation of said food forming machine at a substantially uniform density and weight, said control system comprising:

temperature sensing means mounted in thermal communication with said food substance being formed into said molded food products, said temperature sensing means including a first variable resistance device adapted to electrical connection with a predetermined electrical potential, said first variable resistance device for supplying a first electrical signal that is representative of the temperature of said food substance; and controller means for operating said stroke adjustment rod of said food forming machine to control said pressure exerted by said ram means as an inverse function of the temperature of said food substance, said controller means including a rotary actuator having an output shaft adapted for rotating said rotatable stroke adjustment rod, said control system further comprising a second variable resistance device interconnected with said rotary actuator and responsive to the position of said output shaft of said rotary actuator, said second variable resistance device adapted for electrical interconnection with a predetermined electrical potential for supplying a second electrical signal that is representative of the position of said output shaft of said rotary actuator, said controller means further including means responsive to said first and second electrical signals for activating said rotary actuator to rotate said stroke adjustment rod in a first direction to decrease said pressure exerted by said ram means of said food forming machine when said first electrical signal exceeds said second electrical signal and to rotate said stroke adjustment rod in a second direction to increase said pressure exerted by said ram means of said food forming machine when said second electrical signal exceeds said first electrical signal.

3. The control system of claim 2, wherein said control system further comprises a clutch connected between said output shaft of said rotary actuator and said stroke adjustment rod, said clutch being operable to disengage said output shaft of said rotary actuator from said stroke adjustment rod and being operable to engage said output shaft of said rotary actuator with said stroke adjustment rod.

* * * * *

UNITED STATES PATENT AND TRADEMARK OFFICE
CERTIFICATE OF CORRECTION

PATENT NO. : 4,147,485
DATED : April 3, 1979
INVENTOR(S) : Clifton E. Zimmerman

It is certified that error appears in the above-identified patent and that said Letters Patent are hereby corrected as shown below:

Column 1, line 45: "molded is" is changed to --molded product is--.

Column 5, line 62: "signals" is changed to --signal--.

Column 7, line 64: "mentioned 840A" is changed to --mentioned POWER FORM 840A--.

Column 11, line 42: "applied the" is changed to --applied between the--.

Column 14, line 7: "to" is changed to --for--.

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*